Feb. 5, 1935.  J. D. LEAR  1,989,994
VALVE FOR PNEUMATIC TIRES
Filed June 25, 1931  2 Sheets-Sheet 1
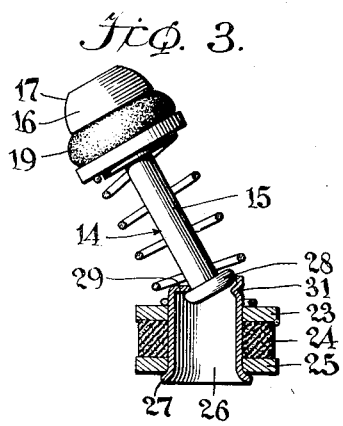
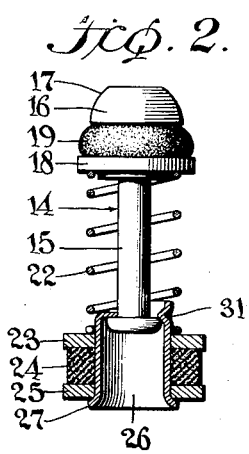
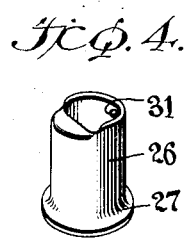
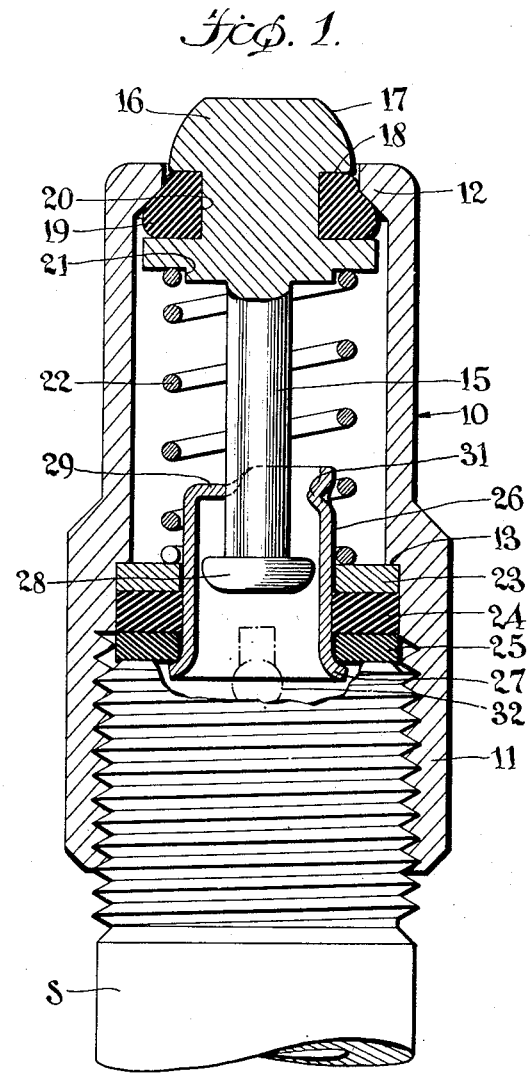
Inventor
Joseph D. Lear
By Bean, Brooks & Henry.
Attorney

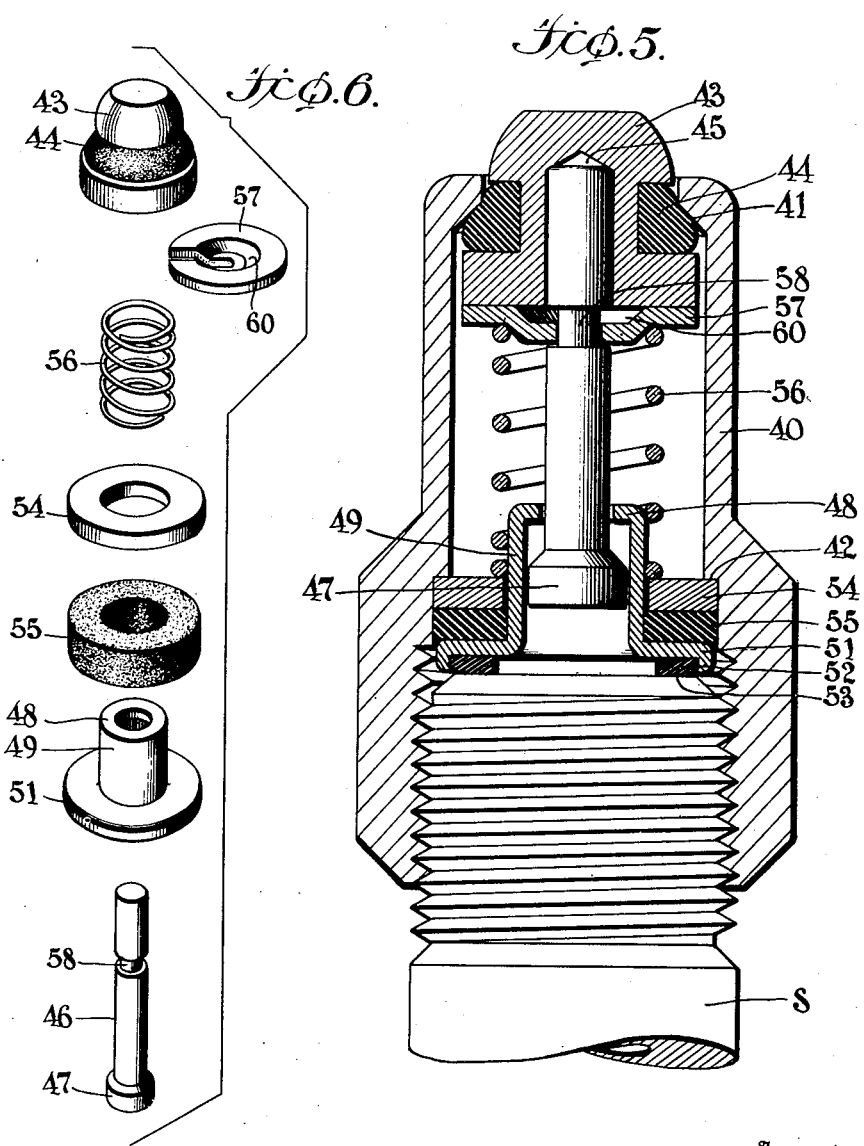

Patented Feb. 5, 1935

1,989,994

UNITED STATES PATENT OFFICE 1,989,994

VALVE FOR PNEUMATIC TIRES

Joseph D. Lear, Buffalo, N. Y., assignor to Sterling Automotive Products Corporation, Buffalo, N. Y.

Application June 25, 1931, Serial No. 546,857

5 Claims. (Cl. 152—12)

This invention relates to valves and has particular reference to that type of valve which is adapted to be threaded upon the stem of a pneumatic tire in the position normally occupied by the conventional dust cap.

The present invention resides in the provision of an improved valve structure which will function as a dust cap and to control the fluid passage through the stem into the pneumatic tire. The invention further resides in the arrangement and structure of the component parts of the valve, which enable it to be expeditiously manufactured and assembled, and which render the valve efficient in operation.

These and other objects and advantages will become apparent from the following description of typical embodiments of the invention, reference being made to the accompanying drawings, wherein:

Fig. 1 is cross-section of the valve unit applied to the stem of a pneumatic tire;

Fig. 2 is a cross-sectional view of the valve assembly shown in Fig. 1, the casing being omitted;

Fig. 3 is a view similar to Fig. 2 showing the parts thereof during one phase of their assembly;

Fig. 4 is a perspective view of a sleeve part of the valve unit shown in Figs. 1 to 3.

Fig. 5 is a cross-section similar to Fig. 1 depicting a modified valve construction and, Fig. 6 is an exploded perspective view of the component parts of the valve of Fig. 5, the casing being omitted.

As shown in Fig. 1, the valve includes a body 10 of generally tubular form having its inner end 11 threaded for attachment to the outer end of a tubular tire stem S. The inner end 11 of the body is preferably thickened in order that it may be knurled or otherwise finished on its exterior for gripping with the fingers or a tool for applying it to the stem S. The outer end of the body is inwardly flanged as indicated at 12 to provide a valve seat, and a shoulder 13 is formed medially of the body to cooperate with the valve seat to retain the interior valve parts depicted in Fig. 2.

These parts comprise a valve 14 having a stem 15 and an enlarged head 16, the latter being rounded at its upper end 17 and there being of slightly smaller diameter than the opening through the outer end of the body 10. The inner end 18 of the enlarged head 16 is of larger diameter than the opening at the outer end of the valve body and together with the portion 17 defines an annular recess 20 in which a flexible valve facing 19 is seated, the latter being preferably formed of rubber or other resilient material, adapted to abut the seat 12 with air and dust sealing contact. The inner face 18 of the head is annularly recessed providing a shoulder 21 retaining, in coaxial relationship with the valve stem, a coil spring 22 which serves normally to seat the valve. The lower end of the spring is supported by a plurality of washers 23, 24 and 25 which are clamped between the shoulder 13 of the body and the outer face of the stem S. In order to provide a rigid support for the spring 22 the uppermost washer 23 is preferably formed of metal and, in order to provide the necessary resilience and flexibility to effect an air-tight seal between the outer end of the stem S and the valve body, the washer 24 is formed of rubber or like flexible and resilient material.

As the complete valve unit is threaded into engagement with the stem S, necessitating rotary sliding movement of the washer upon the upper face of the stem, and as rubber and like materials are not especially adapted to accommodate such frictional contact without being mutilated, the innermost washer 25 is preferably formed of hard fiber or like substance.

A sleeve 26 extends through the washers, having its inner end open and outwardly flanged at 27 to engage the inner face of washer 25. The purpose of the sleeve is to center the inner end of the spring 22 and to guide the inner end of the valve stem, the latter preferably having a head 28, of slightly smaller diameter than interior of the sleeve, at its inner extremity. The outer end of the sleeve is partially closed by an inturned flange portion 29 providing an opening of sufficient size to accommodate the head 28 when the latter is positioned relative to the sleeve as shown in Fig. 3. The wall of the sleeve opposite the flange 29 is provided with a detent 31 for cooperating with the flange 29 to provide a bearing for the outer surface of the head 28 when the parts are in the position shown in Fig. 2.

In assembling the valve, the washers 23, 24 and 25 are placed over the sleeve 26, as shown in Fig. 2, the washer 24 being so proportioned that it tightly engages the outer walls of the sleeve, and the valve, inserted in the spring 22 may then be assembled with the sleeve. In performing this operation the head 28 is placed in the opening at the outer end of the sleeve as shown in Fig. 3 so that the outer face of the head engages under the flange 29, and the valve is then rotated in a clock-wise direction, as the parts are viewed in Fig. 3, to bring them into the relative positions shown in Fig. 2, the detent 31 and the wall of the sleeve containing it being flexed outwardly during this operation to allow the head 28 to snap into position. The valve parts shown in Figs. 2 and 3 may be then inserted as a unit into the tubular body 10, being pressed upwardly therein until the valve facing 19, which may be applied to the valve head 16 either before or after assembly of the valve with the sleeve, abuts the valve seat 12 and the outer surface of the washer 23 abuts the shoulder 13 of the body.

When the valve is completely assembled, as hereinbefore outlined, it may be attached to a tire stem S, being threaded over the outer end of the latter until the washers 23, 24 and 25 are tightly clamped between the shoulder 13 and the upper face of the stem S. During this operation the washer 24 will be compressed so that it will thereafter constantly urge the washer 25 into air-sealing contact with the upper face of the stem and will be expanded radially so that it will tightly engage the walls of the body 10 as shown in Fig. 1.

When it is desired to apply air to the tire, or other object having the stem S, an air applying fitting may be placed against the outer end of the valve, pressing the head 16 inwardly against the compression of the spring 22 and thus allowing space between the valve seat and the valve face 19 for the admission of air into the interior of the body 10, from whence it may pass through the opening in the sleeve 26 and then into the stem S. In the event the valve stem is fitted with the conventional internal air valve, the outer end of a stem of such valve being indicated by dotted lines 32 in Fig. 1, the depression of the valve head 16 and stem 15 will cause the head 28 at the inner end of the stem to engage the stem 32 to effect an opening of such internal valve to allow air to pass therethrough.

It will be understood that normally the valve 19 will be tightly held against its seat 12 by the resilience of the spring 22 and will serve to prevent air from escaping from the stem S and will also function to prevent the ingress of dust or dirt into the interior of the valve. The shoulder 21 of the valve head and the outer end of the sleeve 26 will cooperate to maintain the spring 22 in alignment with the body 10 and the valve stem so that the pressure of the valve facing 19 upon the seat 12 will be substantially equal about the area of contact.

In the modified valve construction shown in Figs. 5 and 6, the valve body 40 may be of substantially the same form as the valve body 10 previously described, having a valve seat 41 at its outer end, a shoulder 42 on its interior wall and medially of its ends, and having means at its inner end for attachment to a tire stem S. The valve 43 is similar in contour to the valve head 16 and being provided with valve facing material 44. It has a central pocket 45 for receiving the outer end of a separate valve stem 46, the latter having at its inner end an enlarged head 47 of greater diameter than the opening provided by the in-turned flange 48 at the upper end of a surrounding sleeve 49. The inner end of the sleeve is outwardly flanged as indicated at 51 and terminates in an inwardly extending peripheral flange portion 52. The sleeve is supported by a washer 53, preferably formed of fiber or like material, which seats in the recess provided by the flanges 51 and 52, and by a pair of washers 54 and 55 disposed between the outer face of the flange 51 and the shoulder 42 of the body. The outer washer 54 preferably is formed of metal to provide a substantially rigid seat for a coil spring 56, which is centered by the sleeve 49 and which at its upper end bears against a slotted washer 57 engaged in a recessed portion 58 of the stem 46, the washer 57 having a central depression 60 to center the outer end of the spring.

In assembling the device the washer 53 may be first inserted in the sleeve 49, being retained therein by frictional contact with the flange 52, and the washers 54 and 55 may then be pressed onto the sleeve. The stem 46 is then inserted through the sleeve, the spring 56 inserted over the stem and sleeve, and the slotted washer 57 then fitted over the recessed portion 58 of the stem 46 to retain the spring 56 in place and compressed to a slight degree between the inner face of the washer 57 and the outer face of the washer 54. The head 43 may be applied to the outer end of the stem and the assembled parts then inserted as a unit into the tubular body 40. The device thus completely assembled may be applied to the tire stem S, the body 40 being threaded over the outer end of the stem until the rubber washer 55 is compressed and has its edges in tight engagement with the side walls of the body 40, thereby functioning to urge the sleeve 49 and washer 53 into air-tight engagement with the upper face of the stem S.

In operation the valve will function in the same manner as that shown in Figs. 1 to 4 inclusive. In operation the spring 56 normally urges the valve 43 outwardly to cause the valve facing 44 to contact the valve seat 41 to provide an air-tight seal. Upon depression of the valve 43 by an air applying device, against the compression of the spring 56, space will be provided between the face 44 and the seat 41 to admit air into the interior of the valve body 40 and thence through the opening at the upper ends of the sleeve 49 into the stem S.

It will be understood that in the event the valve facings 19 or 41 should require replacement, the valves may be disassembled by reversing the steps of assembly herein described. It will be further understood that the specific embodiments herein described and illustrated are merely illustrative of the principles of the invention which may be, within the scope of this invention, applied to other devices having other structural characteristics and arrangements.

What is claimed is:

1. A demountable valve insert unit comprising a valve having a body and a stem extending from said body and terminating in a head portion, a tubular sleeve member having an internal lug portion adjacent one extremity, said valve being adapted for assembly with said sleeve by angularly inserting said head in said sleeve extremity to engage under said lug, means for retaining said valve and sleeve in substantial axial alignment to prevent angular disassembling movement comprising a washer mounted about said sleeve and a coil spring surrounding said stem and having opposite ends engaging said valve body and said washer respectively to separate said members and to retain said head in engagement with said lug.

2. A demountable valve insert unit comprising a valve having a body and a stem extending from said body and terminating in a head portion, a tubular sleeve member having an internal lug portion adjacent one extremity, said valve being assembled with said sleeve by angularly inserting said head in said extremity to engage under said lug, means for retaining said valve and sleeve in substantial axial alignment to prevent angular disassembling movement comprising a washer mounted about said sleeve and a coil spring having convolutions engaging about said sleeve and having opposite ends engaging said valve body and said washer respectively to separate said members and to retain said head in engagement with said lug.

3. A demountable valve insert unit comprising a gasket unit having a tubular sleeve formed with an internal lug at one extremity and an external peripheral flange at the opposite extremity, a fibrous washer engaging about the exterior of the sleeve and abutting said flange, a rubber washer about said tube adjacent said fibrous washer, and a metallic washer about said sleeve adjacent said rubber washer, a valve removably mounted in said gasket unit and comprising a body portion and a stem portion extending therefrom and terminating in a head portion engaging under the lug of said tubular sleeve, means for retaining said sleeve and valve in axial alignment comprising a coil spring surrounding said stem and having opposite ends engaging said valve body and said metallic washer respectively.

4. A valve for a tire valve stem comprising a body having a threaded bore extending into one extremity and terminating in an internal shoulder, a valve chamber entering said bore, a seat in said chamber and a valve on said seat, said valve having a stem portion, a gasket unit comprising a tube for slidably receiving said stem portion, a metallic washer on said tube adapted to engage said shoulder, a washer of resilient material on said tube adapted to engage said metallic washer, and a washer on said tube of relatively harder material than said resilient washer and engaging the same, said last washer being adapted to be engaged by the end of the tire stem when the body is screwed thereon to prevent air escape about the end of the stem, said resilient washer being compressed between said last washer and said metallic washer and caused to expand into intimate contact with the wall of said bore and the outer wall of said tube, whereby said stem and body are sealed against air escape about said shoulder and through said threads, said tube during the described assembly operation being retained in concentricity with the chamber by the metallic washer to provide an axial guiding means for the valve stem.

5. A valve for a tire valve stem comprising a body having a threaded bore extending into one extremity and terminating in an internal shoulder, a valve chamber entering said bore, a seat in said chamber and a valve on said seat, said valve having a stem portion, gasket mounting means in said body having connected annular and tubular portions, said annular portion engaging said shoulder and said tubular portion having an inner face substantially concentric to said bore, said valve stem being received within said tubular portion for guided movement on the inner face thereof, a washer of resilient material engaging about said tubular portion and abutting said annular portion, a washer of relatively harder material engaging about said tubular portion and abutting said resilient washer, said last washer adapted to be engaged by the end of the tire stem when the body is screwed thereon to prevent air escape about the end of the stem, said resilient washer being compressed between said annular portion and said last washer and adapted to expand to intimately engage the wall of the larger bore and the outer wall of said tube, whereby said stem and body are sealed against air escape about said shoulder and through the threads.

JOSEPH D. LEAR.